United States Patent [19]

Ogawa

[11] 4,348,082
[45] Sep. 7, 1982

[54] ZOOM LENS HAVING HIGH ZOOM RATIO INCLUDING WIDE ANGLE RANGE

[75] Inventor: Ryota Ogawa, Kawagoe, Japan

[73] Assignee: Asahi Kogaku Kogyo Kabushiki Kaisha, Tokyo, Japan

[21] Appl. No.: 149,410

[22] Filed: May 13, 1980

[30] Foreign Application Priority Data

May 16, 1979 [JP] Japan ........................ 54-60040

[51] Int. Cl.³ ............................................. G02B 15/14
[52] U.S. Cl. ........................................ 350/423; 350/428
[58] Field of Search ...................... 350/423, 427, 428

[56] References Cited

U.S. PATENT DOCUMENTS 3,549,242 12/1970 Higuchi et al. ................ 350/423
4,062,621 12/1977 Fleischman ................... 350/428
4,240,700 12/1980 Ogawa ......................... 350/423
4,298,251 11/1981 Hartmann ..................... 350/428

Primary Examiner—John K. Corbin
Assistant Examiner—Scott J. Sugarman
Attorney, Agent, or Firm—Sughrue, Mion, Zinn, Macpeak and Seas

[57] ABSTRACT

A compact zoom lens having a high zoom ratio including a wide angle range is composed of a first positive lens group, a second negative lens group and a positive third lens group arranged in that order from the object side of the lens. The first and third lens groups are integrally movable toward the object from the wide angle end to the telephoto end of the lens system. The second lens group is movable independently of the first and third lens groups.

5 Claims, 19 Drawing Figures

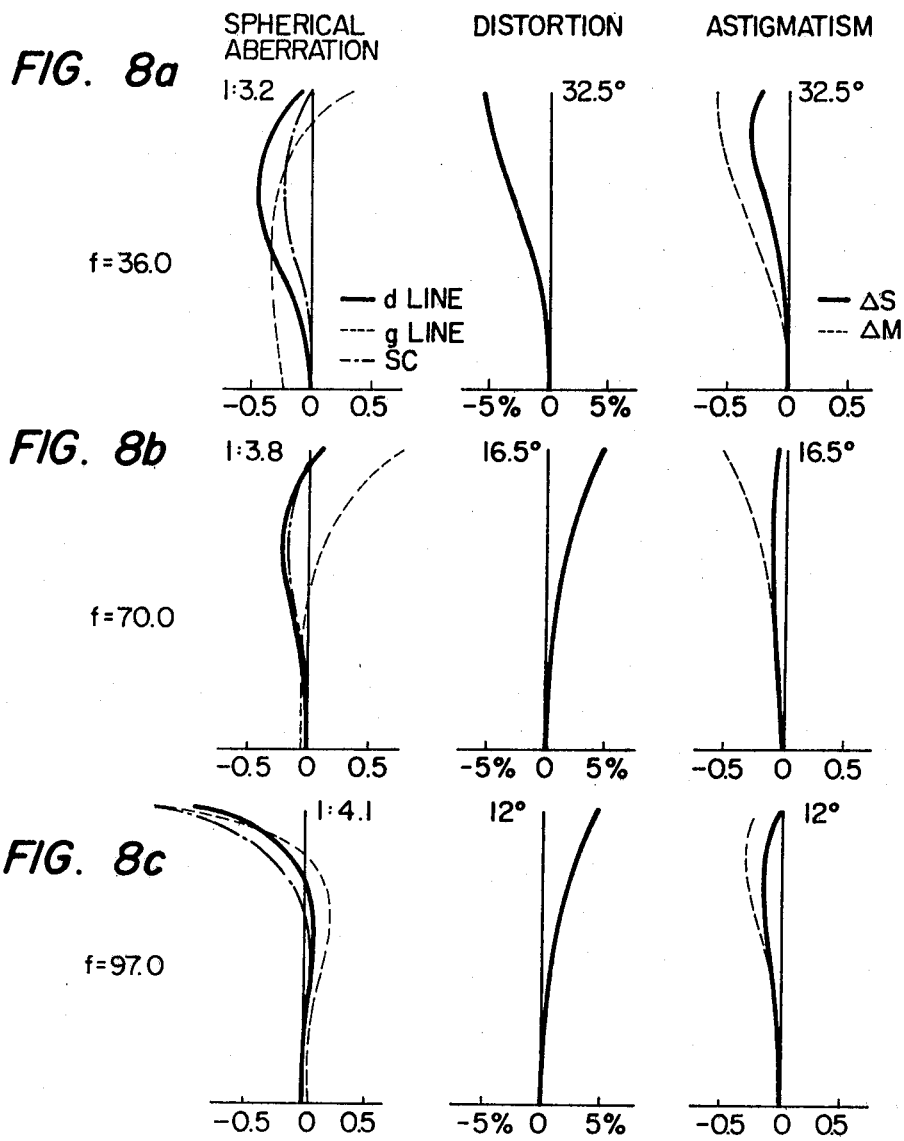

1

ZOOM LENS HAVING HIGH ZOOM RATIO INCLUDING WIDE ANGLE RANGE

BACKGROUND OF THE INVENTION

The present invention relates to a zoom lens covering a broad range from wide angle to telephoto photographing position.

Recently, zoom lenses which are designed to cover the wide angle region and which have a high zoom ratio of approximately three have been available. In such a zoom lens, lens powers of the various lens groups must be quite high in order to provide a sufficient zoom ratio. Such zoom lenses are disadvantageous as they have various pronounced aberrations including comatic aberration and magnification chromatic aberration.

In order to overcome the above noted defects, an object of the present invention is to provide a compact zoom lens in which the operation thereof is relatively easy and the various aberrations are well compensated for.

SUMMARY OF THE INVENTION

A zoom lens moving mechanism according to the present invention will be hereinafter described.

Generally, to provide a zoom lens having a high magnification ratio, they have previously designed to have a wide zoom range with only a short distance of lens movement. The resulting lens system, however, tends to be too sensitive to positioning errors and, in addition, it is likely to have large variations in aberration.

In contrast thereto, in accordance with the present invention the movement of lens groups of a zoom lens is made relatively long while a wide zoom ratio range is obtained. As a result, it is possible to reduce aberration generation to a minimum. The overall lens system should not be large in size so that the space needed for movement thereof is not overly large. To accomplish this, the variator lens group of the system is simultaneously moved in the direction of magnification increase for zoom variation whereby the zoom range for the overall zoom lens is maintained sufficient with only a relatively short resultant movement so that the space which need be provided for the lens system is quite reasonable.

In a basic construction of the zoom lens according to the present invention, the lens includes, in order from the object side, a first lens group $G_1$ having a positive refractive power, a negative second lens group $G_2$ and a positive third lens group $G_3$. In regard to the manner of movement the lens groups, the first and third lens groups are moved together toward the object from the wide angle end to the telephoto end of the lens system. The second lens group, which is disposed between the first and third groups, is movable independently of the first and third lens groups.

BRIEF DESCRIPTION OF THE DRAWINGS

FIGS. 8a–8c are graphs showing various aberrations at the wide angle end, in the middle and at the telephoto end of a second example of a lens of the invention;

DESCRIPTION OF THE PREFERRED EMBODIMENTS

Figure 2:
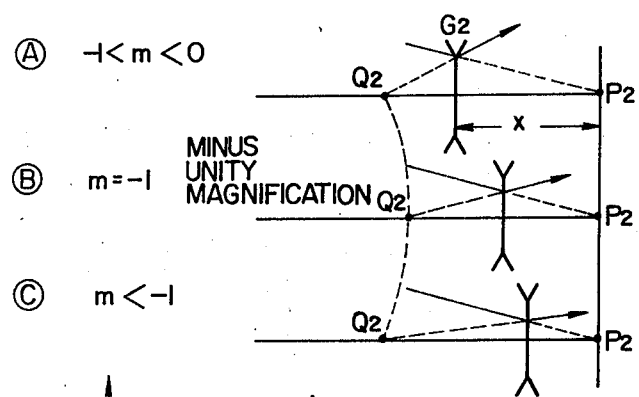
FIG. 2 is a diagram showing the magnification factor variation of the lens illustrated in FIG. 1.
Figure 3:
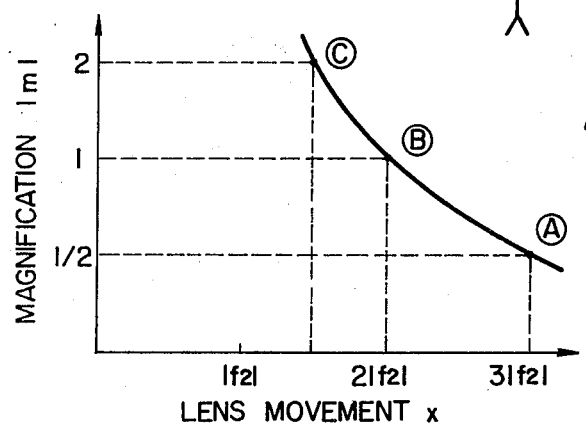
FIG. 3 is an illustration of the relationship between the amount of movement and the amount of variation of the second lens group.

Referring first to FIG. 2, the variator effect of the second lens group $G_2$ will be described. A point image focussed through the first lens group $G_1$ is received by the second lens group $G_2$ as a point object $P_2$ and emerges from the second lens group as a point image $Q_2$. The position of the second lens group $G_2$ with respect to the above described point object $P_2$ is shown as X in FIG. 3 which shows the relationship between the position X and the magnification ratio m of the second lens group $G_2$. The magnification ratio m is plotted logarithmically. In order to obtain, for example, a magnification ratio of two by the second lens group $G_2$, comparing the region from A to B ($-1 \leq m < 0$) on the low magnification side with the region B to C ($m \leq -1$) on the high magnification side, it will be understood that a greater amount of movement is needed in the former case. Accordingly, the region A to B is utilized in the present invention in which the magnification ratio of the second lens group is substantially minus one at the telephoto end.

Figure 4:
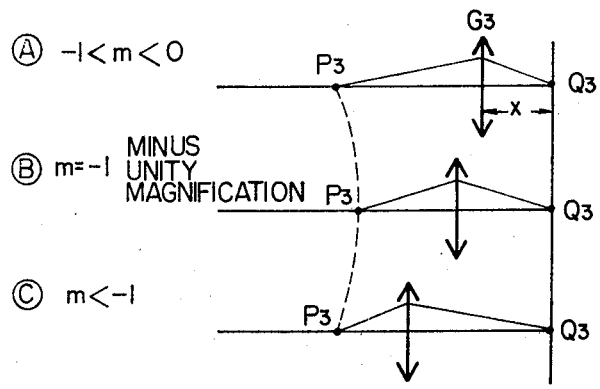
FIG. 4 is an illustration showing the manner of variation of the magnification factor of a lens of the invention.
Figure 5:
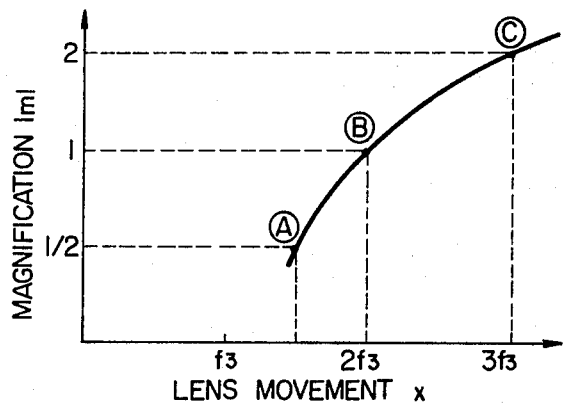
FIG. 5 is an illustration showing the relationship between the amount of movement and the amount of variation of the third lens group of the lens illustrated in FIG. 1.

On the other hand, in contrast to the magnification characteristics of the second lens group $G_2$, in the third lens group, a high magnification ratio is used. Referring to FIG. 4, the variator effect of the third lens group $G_3$ will be explained. The image from the second lens group $G_2$ is received as a point image $P_3$ which emerges from the second lens group as point image $Q_3$ which is a point image of the overall lens system and therefore must be stationary. The position of the third lens group $G_3$ is denoted by X with respect to the above described point image $Q_3$. With reference to FIG. 5, in the same manner as in FIG. 3, in order to obtain a magnification ratio of two by the third lens group $G_3$, comparing the region A to B on the low magnification side ($-1 \leq m < 0$) with the region B to C on the high magnification side ($m \leq -1$), it will be understood from FIG. 5 that the latter range is advantageous in that the movement of the third lens group $G_3$ in the latter case is greater than that in the former case. Accordingly, the high magnification side (the latter case) is selected for use with the present invention in which the magnification is substantial minus one at the wide angle end.

The simultaneous magnification ratio increase will be explained. In the A to B region in FIG. 2 and the B to C region in FIG. 4, the locus of the image point $Q_2$ (designated by a dotted line) of the second lens group $G_2$ and the locus of the object point $P_3$ (also designated by a dotted line) of the third lens group $G_3$ are directed oppositely from one another. This means that if the locus of the object point of the second lens group $G_2$, that is, the image point of the first lens group $G_1$ is, as shown in FIG. 2, maintained constant, it is impossible to combine the second lens group $G_2$ and the third lens group $G_3$ under the condition that the magnification ratio is simultaneously increased.

Figure 6A:
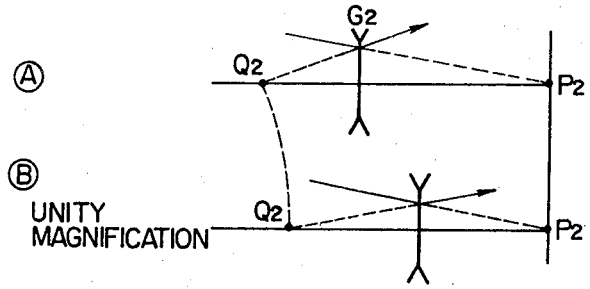
FIGS. 6a and 6b are illustrations of simultaneous magnification factor increase in a lens of the invention.
Figure 6B:
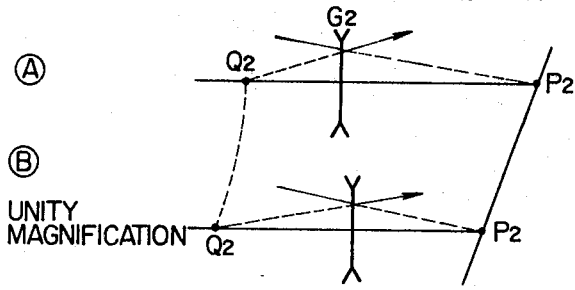
Figure 7A:
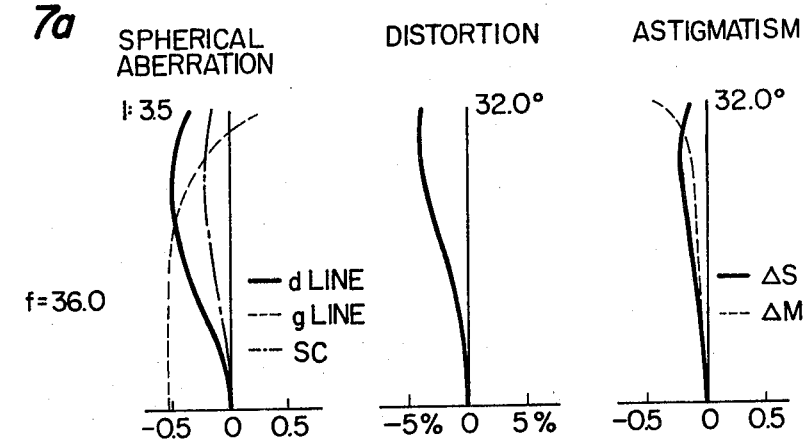
FIGS. 7a–7c are graphs showing various aberrations at the wide end, the middle and at the telephoto end of the lens illustrated in FIG. 10.
Figure 7B:
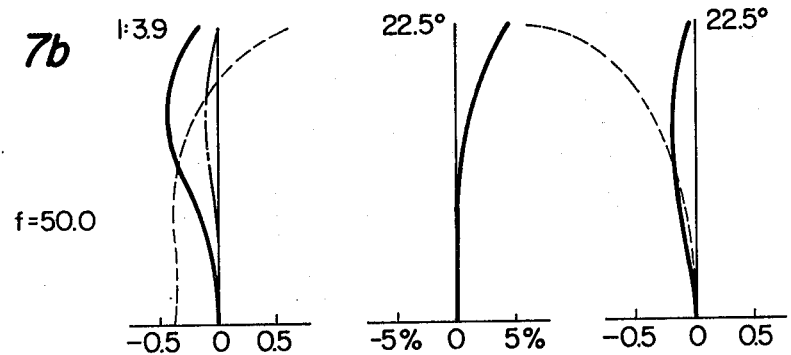
Figure 7C:
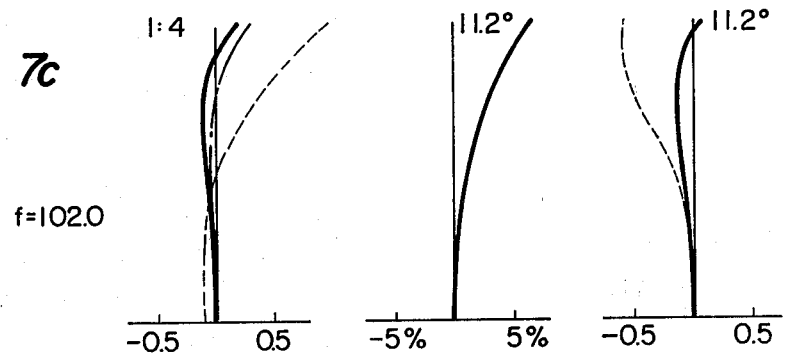
Figure 9A:
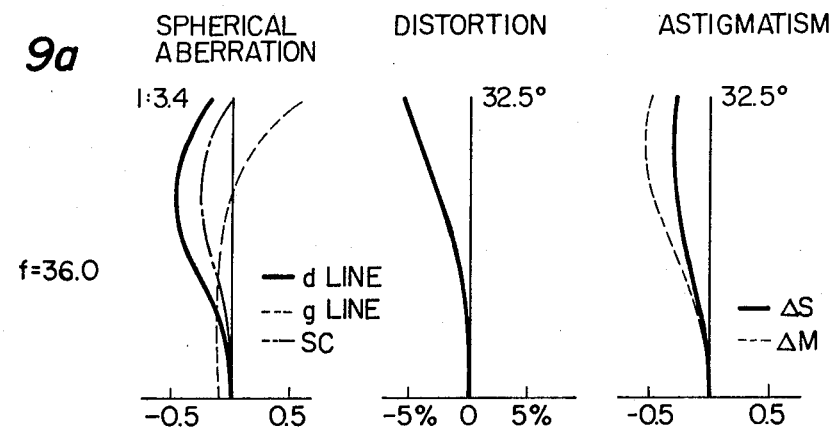
FIGS. 9a–9c are graphs showing various aberrations at the wide angle end, the middle and at the telephoto end of a third example of a lens of the invention.
Figure 9B:
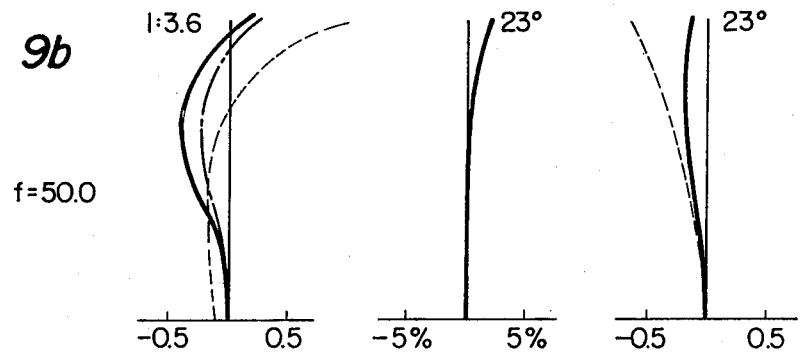
Figure 9C:
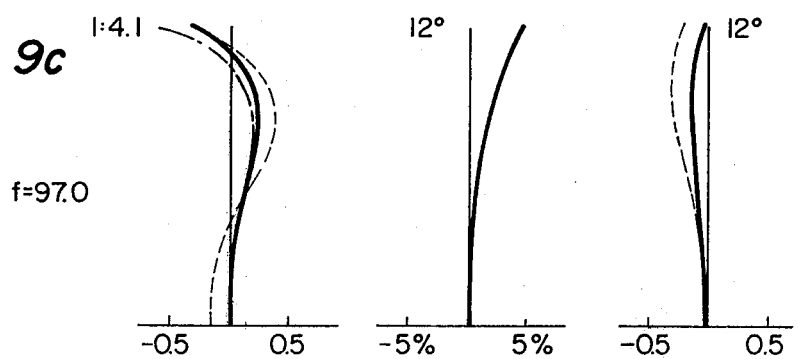
Figure 10:
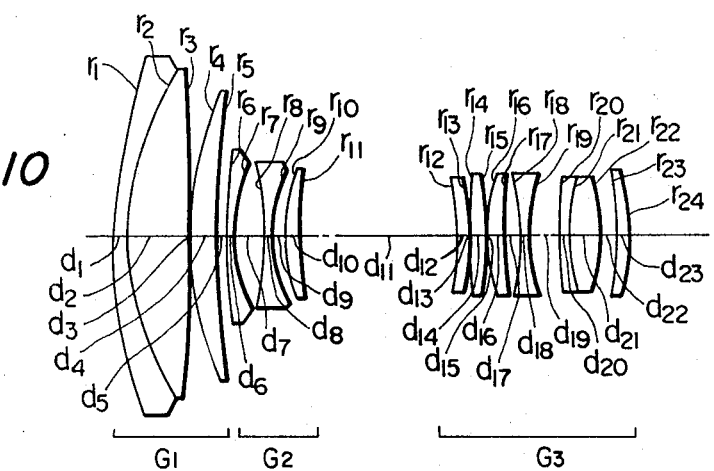
FIGS. 10, 11 and 12 are cross-sectional views showing the lens constructions of the first, second and third examples of a lens of the invention at the wide angle end thereof.
Figure 11:
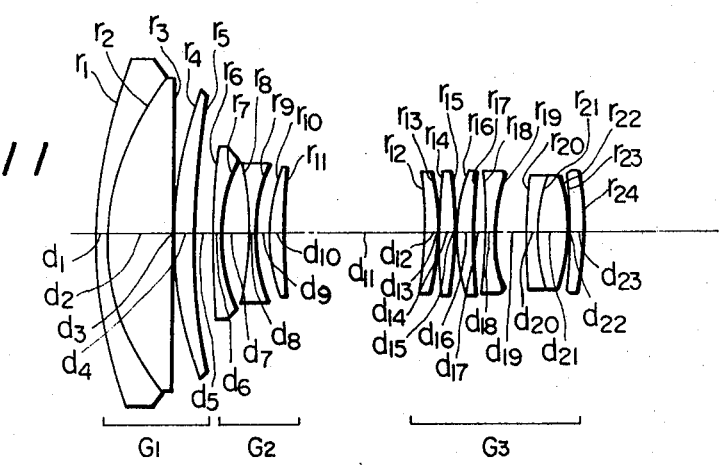
Figure 12:
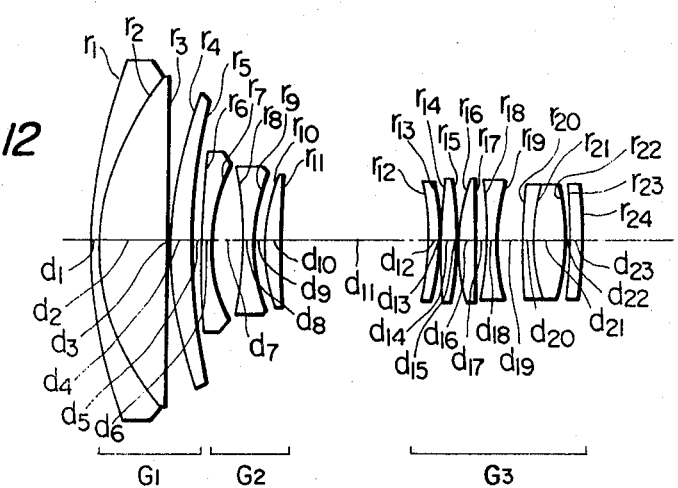

The simultaneous magnification increase is achieved as illustrated in FIGS. 6a and 6b according to the present invention. FIG. 6a shows the A to B region from FIG. 2. If the movement factor is applied to the object point $P_2$ as shown in FIG. 6b, that is, if the first lens group $G_1$ is moved toward the object during a zooming operation from the wide angle to telephoto position, an amount of movement equivalent to the amount of movement of the object point $P_2$ is applied to the loci of the second lens group $G_2$ and the image point $Q_2$. As a result, it is possible to provide the $Q_2$ locus (dotted line) in FIG. 6b and the $P_3$ locus (dotted line) from B to C in FIG. 4 and to combine the second lens group $G_2$ and the third lens group $G_3$ under the condition of simultaneous magnification ratio increase.

As described above, the condition of simultaneous magnification ratio increase is to be realized. Accordingly, in spite of the fact that the region in which the movements of the lens groups are large is used to reduce aberrations, a relatively small and high magnification power zoom lens system is nonetheless realized according to the present invention.

Figure 1:
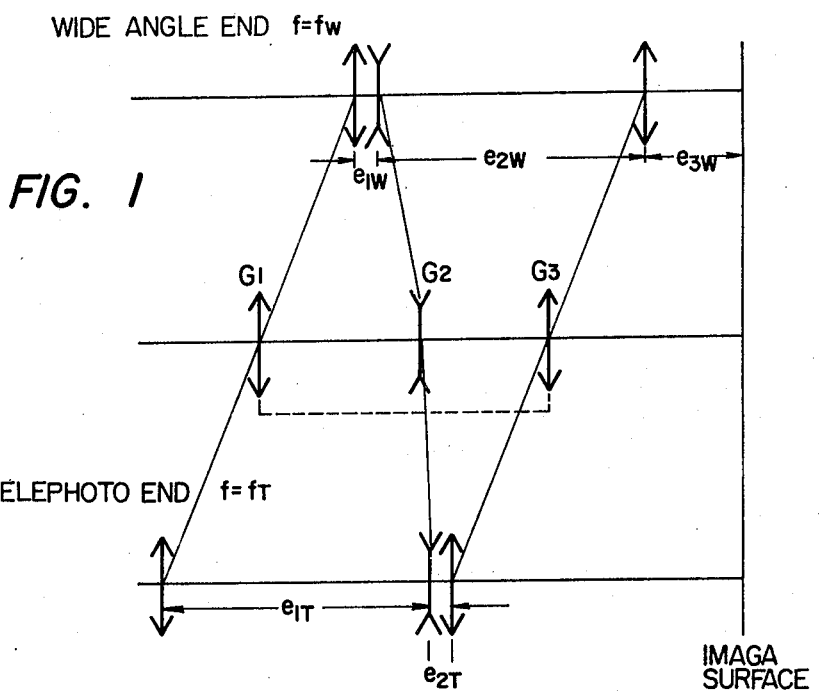
FIG. 1 is a diagram showing the basic lens construction of a zoom lens of the invention.

The above described basic lens construction has both good aberration correction and a high magnification zoom power. Furthermore, the lens of the invention provides contact or macro photographing ability. Macro photographing requires a high magnification ratio. Therefore, it is desired that the mechanism which controls the macro photographing operation be disposed at the telephoto end rather than at the wide angle end of the lens system. Since as illustrated in FIG. 1, at the telephoto end the second lens group $G_2$ has an available space on the object side, this space may be utilized. As described above, the magnification ratio or power imparted to the second lens group $G_2$ is a substantially equal magnification ratio at the telephoto end. Therefore, if the second lens group $G_2$ is moved toward the object, it is possible to describe the object on the lens system side. Assuming that the loaded variation or magnification ratio of the second lens group at the telephoto end is above the iso-magnification value ($m \leq -1$), the object may be moved far from the lens system by movement of the second lens group $G_2$ and the object again moved close thereto after further movement of the second lens group $G_2$ so that a simple continuation effect for the macro photographing mechanism and a high macro photographing ratio cannot be obtained. On the other hand, in case the loaded magnification on the second lens group $G_2$ is within minus one ($-1 \leq m < 0$), it is difficult to appropriately maintain the desired zoom ratio range.

In order to realize the manner of moving the zoom lens as discussed in detail above, the zoom lens system must satisfy the following conditions:

$$0.9 < e_{2W}/f_3 < 1.4, \qquad (1)$$

$$1.8 < f_1/f_W < 2.6, \qquad (2)$$

$$-2.8 < (f_1 - e_{1T})/f_2 < -1.6, \text{ and} \qquad (3)$$

$$0.7 < f_3/f_W < 1.3 \qquad (4)$$

where $f_1$, $f_2$ and $f_3$ are the focal lengths of the first, second and third lens groups $G_1$, $G_2$ and $G_3$, respectively, $e_{2W}$ is the principal point distance between the second and third lens groups $G_2$ and $G_3$ at the wide angle end, $e_{1T}$ is the principal point distance between the first and second lens groups $G_1$ and $G_2$ at the telephoto end, and $f_W$ is the overall focal length of the zoom lens system at the wide angle end.

Conditions (1), (2), (3) and (4) are correlated to each other and must be satisfied simultaneously. Condition (1) is required to provide an approximate iso-magnification ratio for the third lens group $G_3$ at the wide angle end and to maintain a suitable spacing for zooming. Condition (2) is required for maintaining the magnification effect of the second lens group $G_2$ by the first lens group $G_1$. The lower limit of condition (2) is required to maintain the variation of aberrations small. Above the upper limit of the condition (2), the movement of the first lens group $G_1$ tends to increase during focusing operations and it is difficult to maintain an adequate image brightness because the minimum focussing distance to the object will not be sufficiently maintained. Condition (3) is provided to effectuate the variator function of the second lens group $G_2$. This is, as described above with reference to FIGS. 2 and 3, substantially the minus one magnification ratio at the telephoto end. Also, as explained above, continuous macro photographing is obtained by the movement of the second lens group $G_2$ at the telephoto end.

The basic principles of the lens construction of the present invention will now be described. The first lens group is composed, in order from the object side, of a negative meniscus lens $L_1$ having a strong negative lens power toward the image side, a positive lens $L_2$ having a strong positive lens power toward the object side and a positive meniscus lens $L_3$ having a strong positive power toward the object side. The lenses $L_1$ and $L_2$ are cemented to each other. The first lens group satisfies the following conditions $$1.75 < n_1, \qquad (5)$$

$$n_2 < 1.7, \qquad (6)$$

$$1.65 < n_3 < 1.75, \qquad (7)$$

$$\nu_1 < 30, \text{ and} \qquad (8)$$

$$50 < (\nu_2 + \nu_3)/2 \qquad (9)$$

where $n_1$, $n_2$ and $n_3$ are the refractive indices of the lenses $L_1$, $L_2$ and $L_3$, respectively, and $\nu_1$, $\nu_2$ and $\nu_3$ are the Abbe numbers of the lenses $L_1$, $L_2$ and $L_3$, respectively.

The second lens group is composed, in order from the object side, of a negative meniscus lens $L_4$ having a strong negative lens power toward the image side, a negative lens $L_5$ and a positive lens $L_6$ having a strong positive lens power toward the object side. The second lens group satisfies the following conditions:

$$1.7 < (n_4 + n_5)/2, \qquad (10)$$

$$1.75 < n_6, \quad (11)$$

$$45 < (\nu_4 + \nu_5)/2, \quad (12)$$

$$\nu_6 < 30, \text{ and} \quad (13)$$

$$0.15 < r_9/f_2 - r_{10}/f_2 < 0.30 \quad (14)$$

where $r_9$ and $r_{10}$ are radii of curvature of lens surfaces of the lenses $L_5$ and $L_6$ which face each other, $n_4$, $n_5$, $n_6$ are the refractive indexes of the lenses $L_4$, $L_5$ and $L_6$, respectively, and $\nu_4$, $\nu_5$ and $\nu_6$ are the Abbe numbers of the lenses $L_4$, $L_5$ and $L_6$, respectively.

The third lens group is composed, in order from the object side, of a positive meniscus lens $L_7$ having a strong negative lens power toward the object, a biconvex lens $L_8$, positive lens $L_9$, a negative lens $L_{10}$, a negative meniscus lens $L_{11}$ having a strong negative lens power toward the image, a biconvex lens $L_{12}$ and a positive lens $L_{13}$ with the lenses $L_{11}$ and $L_{12}$ cemented to each other. The third lens group satisfies the following conditions:

$$-3f_3 < r_{12} < -f_3, \quad (15)$$

$$0.6f_3 < r_{19} < 1.5f_3, \quad (16)$$

$$0.4f_3 < r_{21} < 0.8f_3, \quad (17)$$

$$n_{10} < 1.70 \quad (18)$$

$$0.2 < n_{11} - n_{12}, \quad (19)$$

$$\nu_{10} < 30, \text{ and} \quad (20)$$

$$15 < \nu_{12} - \nu_{11} \quad (21)$$

where $n_7, n_8, \ldots, n_{13}$ are the refractive indices of the lenses $L_7, L_8, \ldots, L_{13}$, respectively, $\nu_7, \nu_8, \ldots, \nu_{13}$ are the Abbe numbers of the lenses $L_7, L_8, \ldots, L_{13}$, respectively, and $r_{12}, r_{19}, r_{21}$ are the radii of curvature of the object side surface of the lens $L_7$, the image side surface of the lens $L_{10}$ and the image side surface of the lens $L_{11}$, respectively.

Conditions (5) to (21) described above will be explained. Though the zoom lens system according to the present invention is insensitive to small amounts of movement, the lens powers of the various lenses of the lens system tend to be strong in order to maintain a high magnification ratio while allowing the lens to be miniaturized. Particularly the Petzval's value tends to zero or to negative values. The upper limit of condition (7), the conditions (5), (6), (10), (18) and (19) define optical material properties in order to enhance the Petzval's values. To reduce the generation of chromatic aberrations with the high magnification ratio used, it is required that the positive lenses and the negative lenses of the positive lens groups ($G_1$, $G_3$) be made of low dispersion glass and high dispersion glass, respectively, and, inversely, the negative and positive lenses of the negative lens group $G_2$ be made, respectively, of high dispersion glass and low dispersion glass. Conditions (8), (9), (12), (13), (20) and (21) further define the glass material to realize the above-described object. Cementing lenses $L_1$ and $L_2$ in the first lens group is effective to prevent enlargement to the gap between the lenses $L_1$ and $L_2$ due to manufacturing errors which would tend to cause deterioration of the image. Additionally, cementing is effective to transmit to the lenses positioned after the second lens aberrations which are very precisely controlled by the differences of the refractive indices as specified by conditions (5) and (6). The lens $L_3$ is a positive meniscus lens above the lower limit of the condition (6) so that pincushion distortion generated at the telephoto end is reduced at a minimum value.

Lenses $L_4$ and $L_5$ of the second lens groups $G_2$ are both negative and positioned on the object side. This is the reason why the lenses of the opposite sign, namely the negative lenses, must serve to control the various aberrations due to the fact that the first lens group is positive and the last lens in the first lens group is positive. Since the variations of the various aberrations generated at different zooming positions, particularly astigmatism and spherical aberration, must be controlled, a positive meniscus lens $L_6$ is provided. More particularly, the lens $L_6$ is effective to define the opposing lens surfaces $r_{10}$ and $r_{11}$ of the lenses $L_5$ and $L_6$ according to the condition (14). Since the residual astigmatism and comatic aberration in the last lens $L_6$ of the second lens group must be balanced due to the fact that the last lens of the second lens group is positive, a positive meniscus lens $L_7$ having a negative lens power is provided on the object side in compliance with the condition (15). The lens $L_7$ is positive so that the front principal point of the third lens group is close to the object to thereby prevent contact of the lenses at the telephoto end, to maintain a high magnification ratio, and to provide an increase in the Petzval's sum. Lenses $L_{10}$ and $L_{11}$ are both negative so that astigmatism, comatic aberration and distortion can be well corrected with good balance throughout the zooming range and the radius of curvature determined by the conditions (16) and (17) are provided. The lenses $L_{10}$ and $L_{11}$ are separated from each other, while the lens $L_{11}$ is cemented to the lens $L_{12}$ so as to reduce the generation of aberrations at the negative power surfaces $r_{19}$ and $r_{21}$. Further, the cemented surface is defined by the condition (19) to thereby control astigmatism, comatic aberration, and distortion as described.

Specific examples according to the present invention will be described. In these examples, $r_1, r_2, \ldots$ are the radii of curvature of the respective lenses in order from the object side, $d_1, d_2, \ldots$ are the distances between the lens surface of the respective lenses in order from the object side, $n_1, n_2, \ldots$ are the refractive indices of the optical glass of the respective lenses at the d-lines in order from the object side, $\nu_1, \nu_2, \ldots$ are the Abbe numbers of the optical glass of the respective lenses in order from the object side, f is the overall focal length, 2W is the viewing angle, $e_{1W}$ is the distance between the principal points of the first and second lens groups $G_1$ and $G_2$ at the wide angle end, $e_{2W}$ is the distance between the principal points of the second and third lens groups $G_2$ and $G_3$ at the wide angle end, $e_{3W}$ is the distance between the principal point of the third lens group $G_3$ and the image surface at the wide angle end, $e_{1T}$ is the distance between the principal points of the first and second lens groups $G_1$ and $G_2$ at the telephoto end, $e_{2T}$ is the distance between the principal points of the second and third lens groups $G_2$ and $G_3$ at the wide angle end, and $f_B$ is the backfocus.

EXAMPLE 1

| APERTURE RATIO | | |
|---|---|---|
| 1:3.5 ~ 4.0 | f = 36 ~ 102 | 2ω = 64° ~ 22.4° |
| 1ST LENS GROUP | | |

-continued

| $r_1$ | 94.075 | $d_1$ | 2.00 | $n_1$ | 1.80518 | $\nu_1$ | 25.4 |
|---|---|---|---|---|---|---|---|
| $r_2$ | 47.054 | $d_2$ | 11.00 | $n_2$ | 1.64000 | $\nu_2$ | 60.1 |
| $r_3$ | −395.190 | $d_3$ | 0.22 | | | | |
| $r_4$ | 61.818 | $d_4$ | 4.67 | $n_3$ | 1.64000 | $\nu_3$ | 60.1 |
| $r_5$ | 182.624 | $d_5$ | 1.57 | (variable) | | | |

2ND LENS GROUP

| $r_6$ | 104.352 | $d_6$ | 1.45 | $n_4$ | 1.88300 | $\nu_4$ | 40.8 |
|---|---|---|---|---|---|---|---|
| $r_7$ | 26.817 | $d_7$ | 4.97 | | | | |
| $r_8$ | −49.373 | $d_8$ | 1.39 | $n_5$ | 1.69680 | $\nu_5$ | 56.5 |
| $r_9$ | 20.728 | $d_9$ | 2.03 | | | | |
| $r_{10}$ | 25.443 | $d_{10}$ | 3.00 | $n_6$ | 1.84666 | $\nu_6$ | 23.9 |
| $r_{11}$ | 97.280 | $d_{11}$ | 25.88 | (variable) | | | |

3RD LENS GROUP

| $r_{12}$ | −59.292 | $d_{12}$ | 2.21 | $n_7$ | 1.51118 | $\nu_7$ | 51.0 |
|---|---|---|---|---|---|---|---|
| $r_{13}$ | −46.658 | $d_{13}$ | 0.28 | | | | |
| $r_{14}$ | 223.960 | $d_{14}$ | 2.42 | $n_8$ | 1.59551 | $\nu_8$ | 39.2 |
| $r_{15}$ | −64.805 | $d_{15}$ | 0.10 | | | | |
| $r_{16}$ | 24.003 | $d_{16}$ | 3.81 | $n_9$ | 1.80518 | $\nu_9$ | 28.0 |
| $r_{17}$ | 154.889 | $d_{17}$ | 1.77 | | | | |
| $r_{18}$ | −83.886 | $d_{18}$ | 2.00 | $n_{10}$ | 1.80518 | $\nu_{10}$ | 25.4 |
| $r_{19}$ | 33.658 | $d_{19}$ | 5.35 | | | | |
| $r_{20}$ | 129.048 | $d_{20}$ | 0.96 | $n_{11}$ | 1.80518 | $\nu_{11}$ | 25.4 |
| $r_{21}$ | 22.365 | $d_{21}$ | 5.57 | $n_{12}$ | 1.51633 | $\nu_{12}$ | 64.1 |
| $r_{22}$ | −31.991 | $d_{22}$ | 2.90 | | | | |
| $r_{23}$ | −66.858 | $d_{23}$ | 2.35 | $n_{13}$ | 1.63980 | $\nu_{13}$ | 34.5 |
| $r_{24}$ | −36.275 | | | | | | |

$f_1 = 74.987$  $f_2 = -21.312$  $f_3 = 37.474$
$e_{1W} = 10.971$  $e_{2W} = 44.488$  $e_{3W} = 73.516$
$e_{1T} = 32.899$  $e_{2T} = 22.560$

| f | $F_{NO}$ | $d_5$ | $d_{11}$ | $f_b$ | m of 2ND LENS GROUP | m of 3RD LENS GROUP |
|---|---|---|---|---|---|---|
| 36 | 3.5 | 1.57 | 25.88 | 56.70 | −0.499 | −0.962 |
| 50 | 3.9 | 8.89 | 18.56 | 62.15 | −0.602 | −1.107 |
| 102 | 4.0 | 23.50 | 3.95 | 70.35 | −1.026 | −1.326 |

EXAMPLE 2

APERTURE RATIO
1:3.2 ~ 4.1     f = 36 ~ 97     $2\omega = 65° \sim 24°$

1ST LENS GROUP

| $r_1$ | 82.985 | $d_1$ | 2.00 | $n_1$ | 1.80518 | $\nu_1$ | 25.4 |
|---|---|---|---|---|---|---|---|
| $r_2$ | 44.350 | $d_2$ | 10.91 | $n_2$ | 1.69680 | $\nu_2$ | 55.5 |
| $r_3$ | −1099.062 | $d_3$ | 0.22 | | | | |
| $r_4$ | 74.549 | $d_4$ | 3.35 | $n_3$ | 1.69680 | $\nu_3$ | 55.5 |
| $r_5$ | 139.314 | $d_5$ | 2.84 | (variable) | | | |

2ND LENS GROUP

| $r_6$ | 144.040 | $d_6$ | 1.45 | $n_4$ | 1.83481 | $\nu_4$ | 42.7 |
|---|---|---|---|---|---|---|---|
| $r_7$ | 26.694 | $d_7$ | 4.80 | | | | |
| $r_8$ | −48.775 | $d_8$ | 1.39 | $n_5$ | 1.69680 | $\nu_5$ | 55.5 |
| $r_9$ | 20.637 | $d_9$ | 1.99 | | | | |
| $r_{10}$ | 25.473 | $d_{10}$ | 3.00 | $n_6$ | 1.80518 | $\nu_6$ | 25.4 |
| $r_{11}$ | 153.914 | $d_{11}$ | 24.10 | (variable) | | | |

3RD LENS GROUP

| $r_{12}$ | −72.765 | $d_{12}$ | 2.21 | $n_7$ | 1.51454 | $\nu_7$ | 54.7 |
|---|---|---|---|---|---|---|---|
| $r_{13}$ | −45.529 | $d_{13}$ | 0.28 | | | | |
| $r_{14}$ | 162.963 | $d_{14}$ | 2.42 | $n_8$ | 1.60342 | $\nu_8$ | 38.0 |
| $r_{15}$ | −76.128 | $d_{15}$ | 0.10 | | | | |
| $r_{16}$ | 23.129 | $d_{16}$ | 3.58 | $n_9$ | 1.80610 | $\nu_9$ | 40.9 |
| $r_{17}$ | 241.235 | $d_{17}$ | 1.41 | | | | |
| $r_{18}$ | −92.314 | $d_{18}$ | 2.00 | $n_{10}$ | 1.80518 | $\nu_{10}$ | 25.4 |
| $r_{19}$ | 33.456 | $d_{19}$ | 5.23 | | | | |
| $r_{20}$ | 166.725 | $d_{20}$ | 1.20 | $n_{11}$ | 1.80610 | $\nu_{11}$ | 40.9 |
| $r_{21}$ | 20.127 | $d_{21}$ | 5.57 | $n_{12}$ | 1.51633 | $\nu_{12}$ | 64.1 |
| $r_{22}$ | 27.874 | $d_{22}$ | 0.27 | | | | |
| $r_{23}$ | −76.278 | $d_{23}$ | 2.35 | $n_{13}$ | 1.64000 | $\nu_{13}$ | 60.1 |
| $r_{24}$ | −51.349 | | | | | | |

$f_1 = 82.407$  $f_2 = -21.776$  $f_3 = 35.061$
$e_{1W} = 12.497$  $e_{2W} = 39.733$  $e_{3W} = 68.938$
$e_{1T} = 32.699$  $e_{2T} = 19.531$

| f | $F_{NO}$ | $d_5$ | $d_{11}$ | $f_B$ | m of 2ND LENS GROUP | m of 3RD LENS GROUP |
|---|---|---|---|---|---|---|
| 36 | 3.2 | 2.84 | 24.10 | 53.44 | −0.452 | −0.966 |
| 70 | 3.8 | 16.85 | 9.09 | 66.25 | −0.638 | −1.331 |
| 97 | 4.1 | 23.04 | 3.90 | 72.51 | −0.780 | −1.510 |

EXAMPLE 3

APERTURE RATIO
1:3.4 ~ 4.1     f = 36 ~ 97     $2\omega = 65° \sim 24°$

1ST LENS GROUP

| $r_1$ | 75.447 | $d_1$ | 2.00 | $n_1$ | 1.80518 | $\nu_1$ | 25.4 |
|---|---|---|---|---|---|---|---|
| $r_2$ | 42.735 | $d_2$ | 11.51 | $n_2$ | 1.69680 | $\nu_2$ | 55.5 |
| $r_3$ | 12975.874 | $d_3$ | 0.22 | | | | |
| $r_4$ | 65.482 | $d_4$ | 4.00 | $n_3$ | 1.69680 | $\nu_3$ | 55.5 |
| $r_5$ | 112.566 | $d_5$ | 1.39 | (variable) | | | |

2ND LENS GROUP

| $r_6$ | 150.089 | $d_6$ | 1.70 | $n_4$ | 1.83481 | $\nu_4$ | 42.7 |
|---|---|---|---|---|---|---|---|
| $r_7$ | 23.526 | $d_7$ | 5.25 | | | | |
| $r_8$ | −56.150 | $d_8$ | 1.39 | $n_5$ | 1.69680 | $\nu_5$ | 55.5 |
| $r_9$ | 20.948 | $d_9$ | 1.92 | | | | |
| $r_{10}$ | 25.599 | $d_{10}$ | 3.20 | $n_6$ | 1.80518 | $\nu_6$ | 25.4 |
| $r_{11}$ | 247.455 | $d_{11}$ | 24.599 | (variable) | | | |

3RD LENS GROUP

| $r_{12}$ | −55.704 | $d_{12}$ | 2.21 | $n_7$ | 1.51454 | $\nu_7$ | 54.7 |
|---|---|---|---|---|---|---|---|
| $r_{13}$ | −45.072 | $d_{13}$ | 0.28 | | | | |
| $r_{14}$ | 153.540 | $d_{14}$ | 2.42 | $n_8$ | 1.60342 | $\nu_8$ | 38.0 |
| $r_{15}$ | −76.018 | $d_{15}$ | 0.10 | | | | |
| $r_{16}$ | 23.185 | $d_{16}$ | 3.51 | $n_9$ | 1.80610 | $\nu_9$ | 40.9 |
| $r_{17}$ | 274.654 | $d_{17}$ | 1.40 | | | | |
| $r_{18}$ | −86.426 | $d_{18}$ | 2.00 | $n_{10}$ | 1.80518 | $\nu_{10}$ | 25.4 |
| $r_{19}$ | 33.439 | $d_{19}$ | 4.77 | | | | |
| $r_{20}$ | 153.931 | $d_{20}$ | 1.17 | $n_{11}$ | 1.80610 | $\nu_{11}$ | 40.9 |
| $r_{21}$ | 20.126 | $d_{21}$ | 5.90 | $n_{12}$ | 1.51633 | $\nu_{12}$ | 64.1 |
| $r_{22}$ | −26.282 | $d_{22}$ | 0.27 | | | | |
| $r_{23}$ | −257.963 | $d_{23}$ | 2.35 | $n_{13}$ | 1.64000 | $\nu_{13}$ | 60.1 |
| $r_{24}$ | −103.899 | | | | | | |

$f_1 = 79.855$  $f_2 = -21.858$  $f_3 = 35.946$
$e_{1W} = 12.068$  $e_{2W} = 41.631$  $e_{3W} = 69.995$
$e_{1T} = 32.881$  $e_{2T} = 20.818$

| f | $F_{NO}$ | $d_5$ | $d_{11}$ | $f_B$ | m of 2ND LENS GROUP | m of 3RD LENS GROUP |
|---|---|---|---|---|---|---|
| 36 | 3.4 | 1.39 | 24.60 | 55.57 | −0.476 | −0.947 |
| 50 | 3.6 | 8.77 | 17.22 | 61.21 | −0.567 | −1.104 |
| 97 | 4.1 | 22.20 | 3.79 | 71.69 | −0.870 | −1.408 |

DISTANCES OF CLOSE UP PHOTOGRAPHING MAGNIFICATION −0.3×

| $d_5 = 5.64$ | $d_{11} = 20.35$ | $f_B = 71.69$ |
|---|---|---|

What is claimed is:

1. A zoom lens wherein a resultant refractive power is determined by a positive first lens group, a negative second lens group and a positive third lens group arranged in that order from the object side, said first and third lens groups being integrally movable along the optical axis to thereby vary the zoom ratio, a compact zoom lens system having a high zoom ratio including a wide angle range characterized in that:

(a) said second and third lens groups are adapted to simultaneously increase respective zoom ratios, said zoom lens satisfying the following conditions:

$$0.9 < e_{2W}/f_3 < 1.4,$$

$$1.8 < f_1/f_W < 2.6$$

$$-2.8 < (f_1 - e_{1T})/f_2 < -1.6, \text{ and}$$

$$0.7 < f_3/f_W < 1.3$$

where $f_1$, $f_2$ and $f_3$ are the focal lengths of the first, second and third lens groups, respectively, $e_{2W}$ is the distance between the principal points of said second and third lens groups at the wide angle end of said lense, $e_{1T}$ is the distance between the principal points of said first and second lens groups at the telephoto end of said lens, and $f_W$ is the overall focal length at the wide angle end of said lens;

(b) said first lens group is composed, in order from the object side, of a negative meniscus lens $L_1$ having a strong negative lens power toward the image side, a positive lens $L_2$ having a strong positive lens power toward the object side and a positive meniscus lens $L_3$ having a strong positive power toward the object side, the lenses $L_1$ and $L_2$ being cemented to each other, said first lens group satisfying the following conditions:

$1.75 < n_1$, $n_2 < 1.7$, $1.65 < n_3 < 1.75$, $\nu_1 < 30$, and $50 < (\nu_2 + \nu_3)/2$ where $n_1$, $n_2$ and $n_3$ are the refractive indices of the lenses $L_1$, $L_2$ and $L_3$, respectively, and $\nu_1$, $\nu_2$ and $\nu_3$ are the Abbe numbers of the lenses $L_1$, $L_2$ and $L_3$, respectively;

(c) said second lens groups is composed, in order from the object side, of a negative meniscus lens $L_4$ having a strong negative lens power toward the image side, a negative lens $L_5$ and a positive lens $L_6$ having a strong positive lens power toward the object side, said second lens group satisfying the following conditions:

$1.7 < (n_4 + n_5)/2$, $1.75 < n_6$, $45 < (\nu_4 + \nu_5)/2$, $\nu_6 < 30$, and $0.15 < r_9/f_2 - r_{10}/f_2 < 0.30$ where $r_9$ and $r_{10}$ are radii of curvature of the lens surfaces of the lenses $L_5$ and $L_6$ facing each other, $n_4$, $n_5$, $n_6$ are the refractive indices of the lenses $L_4$, $L_5$ and $L_6$, respectively, and $\nu_4$, $\nu_5$, and $\nu_6$ are the Abbe number of the lenses $L_4$, $L_5$ and $L_6$, respectively;

(d) said third lens group is composed, in order from the object side, of a positive meniscus lens $L_7$ having a strong negative lens power toward the object, a biconvex lens $L_8$, positive lens $L_9$, a negative lens $L_{10}$, a negative meniscus lens $L_{11}$ having a strong negative lens power toward the image, a biconvex lens $L_{12}$ and a positive lens $L_{13}$, the lenses $L_{11}$ and $L_{12}$ being cemented to each other, said third lens group satisfying the following conditions:

$-3f_3 < r_{12} < -f_3$, $0.6f_3 < r_{19} < 1.5f_3$, $0.4f_3 < r_{21} < 0.8f_3$, $n_{10} > 1.70$, $0.2 < n_{11} - n_{12}$, $\nu_{10} < 10$, and $15 < \nu_{12} - \nu_{11}$ where $n_7$, $n_8$, ..., $n_{13}$ are the refractive indices of the lenses $L_7$, $L_8$, ..., $L_{13}$, respectively, $\nu_7$, $\nu_8$, ..., $\nu_{13}$ are the Abbe numbers of the lenses $L_7$, $L_8$, ..., $L_{13}$, respectively, and $r_{12}$, $r_{19}$, $r_{21}$ are the radii of curvature of the object side surface of the lens $L_7$, the image side surface of the lens $L_{10}$ and the image side surface of the lens $L_{11}$, respectively.

2. A zoom lens system as defined in claim 1 wherein macro photographing is achieved by moving said second lens group along the optical axis of said lens toward the object while maintaining the zoom operation at the telephoto end at a constant position.

3. The zoom lens system as defined in claim 1 or 2 wherein:

| APERTURE RATIO 1:3.5 ~ 4.0 | | f = 36 ~ 102 | | 2ω = 64° ~ 22.4° |
|---|---|---|---|---|
| | | 1ST LENS GROUP | | |
| $r_1$ | 94.075 | $d_1$ 2.00 | $n_1$ 1.80518 $\nu_1$ | 25.4 |
| $r_2$ | 47.054 | $d_2$ 11.00 | $n_2$ 1.64000 $\nu_2$ | 60.1 |
| $r_3$ | −395.190 | $d_3$ 0.22 | | |
| $r_4$ | 61.818 | $d_4$ 4.67 | $n_3$ 1.64000 $\nu_3$ | 60.1 |
| $r_5$ | 182.624 | $d_5$ 1.57 (variable) | | |
| | | 2ND LENS GROUP | | |
| $r_6$ | 104.352 | $d_6$ 1.45 | $n_4$ 1.88300 $\nu_4$ | 40.8 |
| $r_7$ | 26.817 | $d_7$ 4.97 | | |
| $r_8$ | −49.373 | $d_8$ 1.39 | $n_5$ 1.69680 $\nu_5$ | 56.5 |
| $r_9$ | 20.728 | $d_9$ 2.03 | | |
| $r_{10}$ | 25.443 | $d_{10}$ 3.00 | $n_6$ 1.84666 $\nu_6$ | 23.9 |
| $r_{11}$ | 97.280 | $d_{11}$ 25.88 (variable) | | |
| | | 3RD LENS GROUP | | |
| $r_{12}$ | −59.292 | $d_{12}$ 2.21 | $n_7$ 1.51118 $\nu_7$ | 51.0 |
| $r_{13}$ | −46.658 | $d_{13}$ 0.28 | | |
| $r_{14}$ | 223.960 | $d_{14}$ 2.42 | $n_8$ 1.59551 $\nu_8$ | 39.2 |
| $r_{15}$ | −64.805 | $d_{15}$ 0.10 | | |
| $r_{16}$ | 24.003 | $d_{16}$ 3.81 | $n_9$ 1.80518 $\nu_9$ | 28.0 |
| $r_{17}$ | 154.889 | $d_{17}$ 1.77 | | |
| $r_{18}$ | −83.886 | $d_{18}$ 2.00 | $n_{10}$ 1.80518 $\nu_{10}$ | 25.4 |
| $r_{19}$ | 33.658 | $d_{19}$ 5.35 | | |
| $r_{20}$ | 129.048 | $d_{20}$ 0.96 | $n_{11}$ 1.80518 $\nu_{11}$ | 25.4 |
| $r_{21}$ | 22.365 | $d_{21}$ 5.57 | $n_{12}$ 1.51633 $\nu_{12}$ | 64.1 |
| $r_{22}$ | −31.991 | $d_{22}$ 2.90 | | |
| $r_{23}$ | −66.858 | $d_{23}$ 2.35 | $n_{13}$ 1.63980 $\nu_{13}$ | 34.5 |
| $r_{24}$ | −36.275 | | | |

$f_1 = 74.987$  $f_2 = -21.312$  $f_3 = 37.474$
$e_{1W} = 10.971$  $e_{2W} = 44.488$  $e_{3W} = 73.516$
$e_{1T} = 32.899$  $e_{2T} = 22.560$

| f | $F_{NO}$ | $d_5$ | $d_{11}$ | $f_b$ | m of 2ND LENS GROUP | m of 3RD LENS GROUP |
|---|---|---|---|---|---|---|
| 36 | 3.5 | 1.57 | 25.88 | 56.70 | −0.499 | −0.962 |
| 50 | 3.9 | 8.89 | 18.56 | 62.15 | −0.602 | −1.107 |
| 102 | 4.0 | 23.50 | 3.95 | 70.35 | −1.026 | −1.326 | where reference characters are defined herein.

4. The zoom lens system as defined in claim 1 or 2 wherein:

| APERTURE RATIO 1:3.2 ~ 4.1 | | f = 36 ~ 97 | | 2ω = 65° ~ 24° |
|---|---|---|---|---|
| | | 1ST LENS GROUP | | |
| $r_1$ | 82.985 | $d_1$ 2.00 | $n_1$ 1.80518 $\nu_1$ | 25.4 |
| $r_2$ | 44.350 | $d_2$ 10.91 | $n_2$ 1.69680 $\nu_2$ | 55.5 |
| $r_3$ | −1099.062 | $d_3$ 0.22 | | |
| $r_4$ | 74.549 | $d_4$ 3.35 | $n_3$ 1.69680 $\nu_3$ | 55.5 |
| $r_5$ | 139.314 | $d_5$ 2.84 (variable) | | |
| | | 2ND LENS GROUP | | |
| $r_6$ | 144.040 | $d_6$ 1.45 | $n_4$ 1.83481 $\nu_4$ | 42.7 |

-continued

| | | | | | | |
|---|---|---|---|---|---|---|
| $r_7$ | 26.694 | $d_7$ | 4.80 | | | |
| $r_8$ | −48.775 | $d_8$ | 1.39 | $n_5$ | 1.69680 $\nu_5$ | 55.5 |
| $r_9$ | 20.637 | $d_9$ | 1.99 | | | |
| $r_{10}$ | 25.473 | $d_{10}$ | 3.00 | $n_6$ | 1.80518 $\nu_6$ | 25.4 |
| $r_{11}$ | 153.914 | $d_{11}$ | 24.10 | (variable) | | |

3RD LENS GROUP

| | | | | | | |
|---|---|---|---|---|---|---|
| $r_{12}$ | −72.765 | $d_{12}$ | 2.21 | $n_7$ | 1.51454 $\nu_7$ | 54.7 |
| $r_{13}$ | −45.529 | $d_{13}$ | 0.28 | | | |
| $r_{14}$ | 162.963 | $d_{14}$ | 2.42 | $n_8$ | 1.60342 $\nu_8$ | 38.0 |
| $r_{15}$ | −76.128 | $d_{15}$ | 0.10 | | | |
| $r_{16}$ | 23.129 | $d_{16}$ | 3.58 | $n_9$ | 1.80610 $\nu_9$ | 40.9 |
| $r_{17}$ | 241.235 | $d_{17}$ | 1.41 | | | |
| $r_{18}$ | −92.314 | $d_{18}$ | 2.00 | $n_{10}$ | 1.80518 $\nu_{10}$ | 25.4 |
| $r_{19}$ | 33.456 | $d_{19}$ | 5.23 | | | |
| $r_{20}$ | 166.725 | $d_{20}$ | 1.20 | $n_{11}$ | 1.80610 $\nu_{11}$ | 40.9 |
| $r_{21}$ | 20.127 | $d_{21}$ | 5.57 | $n_{12}$ | 1.51633 $\nu_{12}$ | 64.1 |
| $r_{22}$ | 27.874 | $d_{22}$ | 0.27 | | | |
| $r_{23}$ | −76.278 | $d_{23}$ | 2.35 | $n_{13}$ | 1.64000 $\nu_{13}$ | 60.1 |
| $r_{24}$ | −51.349 | | | | | |

$f_1 = 82.407$  $f_2 = -21.776$  $f_3 = 35.061$
$e_{1W} = 12.497$  $e_{2W} = 39.733$  $e_{3W} = 68.938$
$e_{1T} = 32.699$  $e_{2T} = 19.531$

| f | $F_{NO}$ | $d_5$ | $d_{11}$ | $f_B$ | m of 2ND LENS GROUP | m of 3RD LENS GROUP |
|---|---|---|---|---|---|---|
| 36 | 3.2 | 2.84 | 24.10 | 53.44 | −0.452 | −0.966 |
| 70 | 3.8 | 16.85 | 9.09 | 66.25 | −0.638 | −1.331 |
| 97 | 4.1 | 23.04 | 3.90 | 72.51 | −0.780 | −1.510 | where reference characters are defined herein.

5. The zoom lens system as defined in claim 1 or 2 wherein:

APERTURE RATIO
1:3.4 ~ 4.1    $f = 36 \sim 97$    $2\omega = 65° \sim 24°$

1ST LENS GROUP

| | | | | | | |
|---|---|---|---|---|---|---|
| $r_1$ | 75.447 | $d_1$ | 2.00 | $n_1$ | 1.80518 $\nu_1$ | 25.4 |
| $r_2$ | 42.735 | $d_2$ | 11.51 | $n_2$ | 1.69680 $\nu_2$ | 55.5 |
| $r_3$ | 12975.874 | $d_3$ | 0.22 | | | |
| $r_4$ | 65.482 | $d_4$ | 4.00 | $n_3$ | 1.69680 $\nu_3$ | 55.5 |
| $r_5$ | 112.566 | $d_5$ | 1.39 | (variable) | | |

2ND LENS GROUP

| | | | | | | |
|---|---|---|---|---|---|---|
| $r_6$ | 150.089 | $d_6$ | 1.70 | $n_4$ | 1.83481 $\nu_4$ | 42.7 |
| $r_7$ | 23.526 | $d_7$ | 5.25 | | | |
| $r_8$ | −56.150 | $d_8$ | 1.39 | $n_5$ | 1.69680 $\nu_5$ | 55.5 |
| $r_9$ | 20.948 | $d_9$ | 1.92 | | | |
| $r_{10}$ | 25.599 | $d_{10}$ | 3.20 | $n_6$ | 1.80518 $\nu_6$ | 25.4 |
| $r_{11}$ | 247.455 | $d_{11}$ | 24.599 | (variable) | | |

3RD LENS GROUP

| | | | | | | |
|---|---|---|---|---|---|---|
| $r_{12}$ | −55.704 | $d_{12}$ | 2.21 | $n_7$ | 1.51454 $\nu_7$ | 54.7 |
| $r_{13}$ | −45.072 | $d_{13}$ | 0.28 | | | |
| $r_{14}$ | 153.540 | $d_{14}$ | 2.42 | $n_8$ | 1.60342 $\nu_8$ | 38.0 |
| $r_{15}$ | −76.018 | $d_{15}$ | 0.10 | | | |
| $r_{16}$ | 23.185 | $d_{16}$ | 3.51 | $n_9$ | 1.80610 $\nu_9$ | 40.9 |
| $r_{17}$ | 274.654 | $d_{17}$ | 1.40 | | | |
| $r_{18}$ | −86.426 | $d_{18}$ | 2.00 | $n_{10}$ | 1.80518 $\nu_{10}$ | 25.4 |
| $r_{19}$ | 33.439 | $d_{19}$ | 4.77 | | | |
| $r_{20}$ | 153.931 | $d_{20}$ | 1.17 | $n_{11}$ | 1.80610 $\nu_{11}$ | 40.9 |
| $r_{21}$ | 20.126 | $d_{21}$ | 5.90 | $n_{12}$ | 1.51633 $\nu_{12}$ | 64.1 |
| $r_{22}$ | −26.282 | $d_{22}$ | 0.27 | | | |
| $r_{23}$ | −257.963 | $d_{23}$ | 2.35 | $n_{13}$ | 1.64000 $\nu_{13}$ | 60.1 |
| $r_{24}$ | −103.899 | | | | | |

$f_1 = 79.855$  $f_2 = -21.858$  $f_3 = 35.946$
$e_{1W} = 12.068$  $e_{2W} = 41.631$  $e_{3W} = 69.995$
$e_{1T} = 32.881$  $e_{2T} = 20.818$

| f | $F_{NO}$ | $d_5$ | $d_{11}$ | $f_B$ | m of 2ND LENS GROUP | m of 3RD LENS GROUP |
|---|---|---|---|---|---|---|
| 36 | 3.4 | 1.39 | 24.60 | 55.57 | −0.476 | −0.947 |
| 50 | 3.6 | 8.77 | 17.22 | 61.21 | −0.567 | −1.104 |
| 97 | 4.1 | 22.20 | 3.79 | 71.69 | −0.870 | −1.408 |

DISTANCES OF CLOSE UP PHOTOGRAPHING MAGNIFICATION −0.3×

$d_5 = 5.64$    $d_{11} = 20.35$    $f_B = 71.69$ where reference characters are defined herein.

* * * * *